United States Patent [19]

Yancy

[11] 4,155,471
[45] May 22, 1979

[54] TRAILER/CONTAINER UNIT

[76] Inventor: John L. Yancy, 868 Main St., Redwood City, Calif. 94064

[21] Appl. No.: 720,824

[22] Filed: Sep. 7, 1976

[51] Int. Cl.² .............................................. B60P 1/34
[52] U.S. Cl. ................................... 414/420; 414/458; 414/471; 414/469
[58] Field of Search ............... 214/313, 390, 502, 515; 298/11

[56] References Cited

U.S. PATENT DOCUMENTS

| | | | |
|---|---|---|---|
| 2,027,421 | 1/1936 | Eisenberg | 298/11 X |
| 3,024,931 | 3/1962 | Grover et al. | 214/390 X |
| 3,083,850 | 4/1963 | Owen | 214/390 |
| 3,619,007 | 11/1971 | Phillips | 214/502 X |

*Primary Examiner*—Robert G. Sheridan
*Attorney, Agent, or Firm*—Henry G. Kohlmann

[57] ABSTRACT

A separate container and receiving trailer adapted for raising and lowering of a said separate container such that the container may be lowered to the ground and left in a stationary position while the trailer may be towed to other work areas. When desired the trailer may be returned to receive the container and then raised to engage and haul the container to other locations. Further the trailer is adapted for raising one end of the container so as to dump the contents thereof when desired.

1 Claim, 6 Drawing Figures

4,155,471

TRAILER/CONTAINER UNIT

BACKGROUND OF THE INVENTION

1. Field of the Invention

This invention relates to devices used for the hauling of materials in containers. Specifically to a trailer having a separate inner container which may be disengaged from the trailer and left at the job site. When container is full the trailer may again engage the container, raise it from the ground such that the trailer may then be hauled away with the container suspended therein.

2. Description of the Prior Art

Ordinarily separate containers are raised by some means attached to the container in order to allow a vehicle to receive said container. Often these containers must remain in a raised position and are not easily accessible unless positioned near or on loading docks or have a separate access such as stairs on campers, in addition, a raised position provides poor stability of the container. Those containers which rest at ground level must be pulled up inclined skids to the receiving vehicle and when fully loaded must be of great strength to withstand the strain placed on such containers when loaded onto the receiving vehicle.

Most of the prior art which teaches the use of such removable containers show devices which are bulky, constructed of heavy materials and must be of great strength. These prior art devices are typified by U.S. Pat. No. 3,362,552, issued to Thiele and U.S. Pat. No. 3,083,852 issued to Lidstrom. Such devices have several inherent disadvantages. First, these units which must remain elevated as in Thiele do not provide easy access and result in poor stability of the suspended container.

Lidstrom teaches a container which must remain elevated in order to be pulled onto the receiving vehicle. However, if no means are available to keep the container elevated then it must be towed up an inclined ramp or on skids which are not shown in Lidstrom but exist in the industry. The container must necessarily be constructed of heavy structural materials so as to withstand the great stresses placed thereon when fully loaded.

SUMMARY OF THE INVENTION

The foregoing disadvantages of the prior art may be avoided in accordance with the principle of this invention wherein a trailer container combination includes a lightweight trailer having an upper horizontal frame vertically adjustable so as to provide a vertical lift to a container adapted for lifting by said trailer from ground level. Uniform lift is applied along the sides of the container allowing strength of construction thereof to be limited to containment of the load received and distribution of stress along the sides of said container. Further said container is lifted from ground level which allows easy access by workmen and stability of container when at rest. Additionally said trailer and container combination is so constructed and arranged that the contents of said container may be removed by dumping motion while container is in the raised position.

The instant invention provides a trailer and container which in combination allow lightweight container construction because all forces required to lift such container in position are distributed equally along the upper sides of the container and do not cause localized points of stress on the container. Further, the container and trailer together form a structurally rigid unit when container is received by trailer and raised into position by insertion of a pair of locking bars.

Further, one end of the trailer is adapted for raising so as to dump the contents of the container when desired.

The object of this invention is to provide a lightweight container and trailer which may be moved from place to place with ease.

Another object of this invention is to provide a trailer which receives a container which rests on the ground in a stable position and uniformly rise the container vertically into a carrying position such that the trailer may be moved carrying the container.

Another object of this invention is to provide a container and trailer combination which allows the container to remain at a fixed location while the trailer may be moved to other locations.

Another object of this invention is to provide a trailer-container combination of lightweight construction which can be used in the field for farming purposes without damaging crops and severely compressing soil.

Finally another object of this invention is to provide a trailer which can raise a carried container at one end to provide a dumping action.

DESCRIPTION OF THE PREFERRED EMBODIMENT

Figure 1:
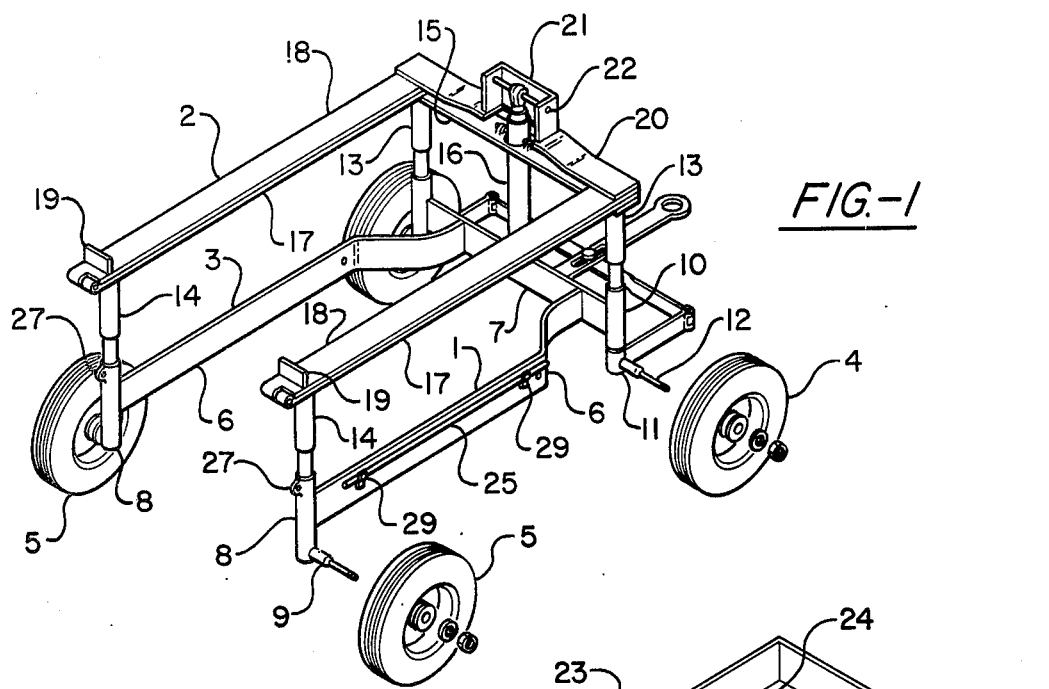
FIG. 1 is a three-dimensional view of the trailer construction.

With reference to the drawings, FIG. 1 shows the trailer 1, comprising upper frame 2 and lower frame 3. Said lower frame 3 is mounted on front wheels 4 and rear wheels 5 and further comprises a pair of first lower horizontally disposed longitudinal member 6 having a generally "S" shaped front ends. Said ends are directed inwardly toward the center of the lower frame 3 and thence in a forwardly direction and fixedly attached to a first lower horizontally disposed transverse member 7 at a point remote from the ends of said transverse member 7. The opposite ends of said lower longitudinal members are fixedly attached to a pair of lower rear vertically disposed tubular members 8. Said tubular members each having a spindle 9 fixedly attached at right angles to said lower longitudinal members for rotatably mounting said rear wheels 5. Said transverse member 7 is fixedly attached at its ends to vertically disposed front tubular members 10. Said tubular members 10 are adapted for receiving a tubular member 11. Said tubular member 11 is rotatably attached to the bottom of said tubular member 10. Fixedly attached to said tubular member 11 is a spindle 12 for rotatably mounting said front wheels 4. Lower tubular members 8 and 10 contain standard hydraulic cylinders which cylinders are received by upper front tubular member 13 and upper rear tubular members 14. Said cylinders are connected to each other by means of an air line not shown in such a manner as to apply equal pressure to all cylinders when air pressure is applied, hence upper tubular members 13 and 14 will rise at a uniform rate and exert equal lifting pressure.

Attached at the tops of said tubular members 13 is horizontal frame 2 which further comprises a second lower front transverse member 15 fixedly attached at the bottom of its ends to the top front tubular members 13 and having a hole in the center thereof for receiving a standard telescoping hydraulic cylinder 16. The body of said telescopic hydraulic cylinder 16 protrudes through said hole and is rotatably attached to second lower transverse member 15 such that the axis of rotation is perpendicular to the longitudinal axis of said cylinder 16. A second pair of lower longitudinal members 17 are fixedly attached at one end to said second transverse member 15 and at the opposite end to said upper rear tubular members 14. Resting on the top of said longitudinal members are a pair of upper longitudinal members 18 rotatably attached at the rear to the rear ends of said second lower longitudinal members 17 and each having a stop 19 spaced apart from the rear ends of said upper longitudinal members 18. Said stops 19 are so positioned that the front side of said stops 19 lie in the same vertical plane as the rearmost edge of tubular members 14. Thus when a container 23 is received by said trailer 1 the rear portion of said container will rest against said stops and also lie in the same plane as tubular members 14. Accordingly locking bars may be inserted through brackets on both the trailer 1 and container 23 which will be described later. Said upper longitudinal members 18 are fixedly attached at the opposite end to an upper transverse member 20. Said upper transverse member 20 having a housing 21 for receiving the upper portion of said standard telescoping hydraulic cylinder 16. Said cylinder 16 being rotatably attached to the upper portion of said housing by means of a pin 22. When air pressure is applied to hydraulic cylinder 16 the front ends of said upper longitudinal members 18 are inclined away from said second lower longitudinal members 17. Said container is prevented from sliding out of said frame by stops 19 and hence a dumping motion is created.

Figure 2:
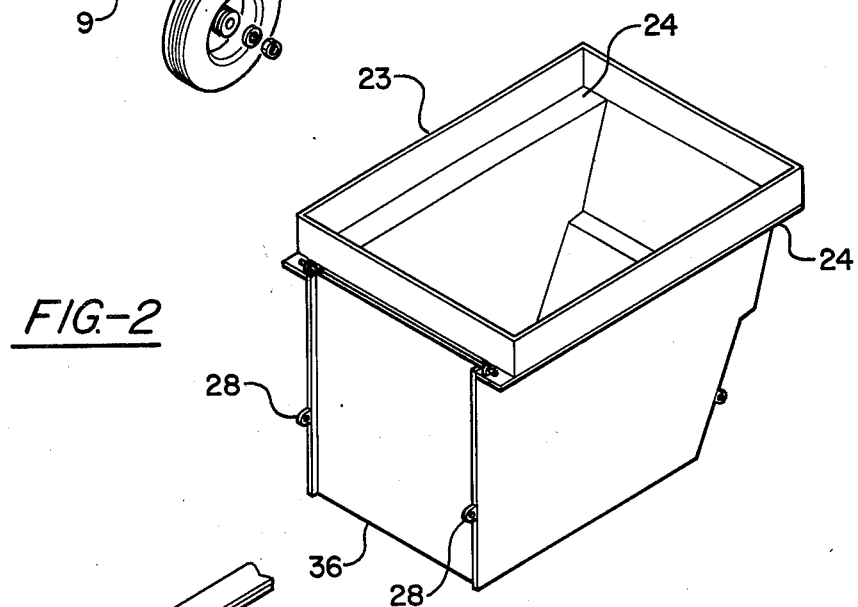
FIG. 2 is a three-dimensional view of the container construction.
Figure 4:
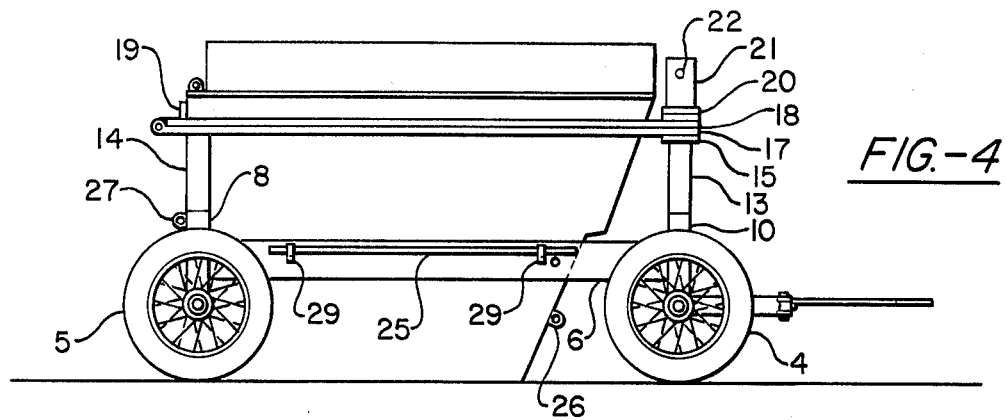
FIG. 4 is a side view of trailer and container in lowered position.
Figure 5:
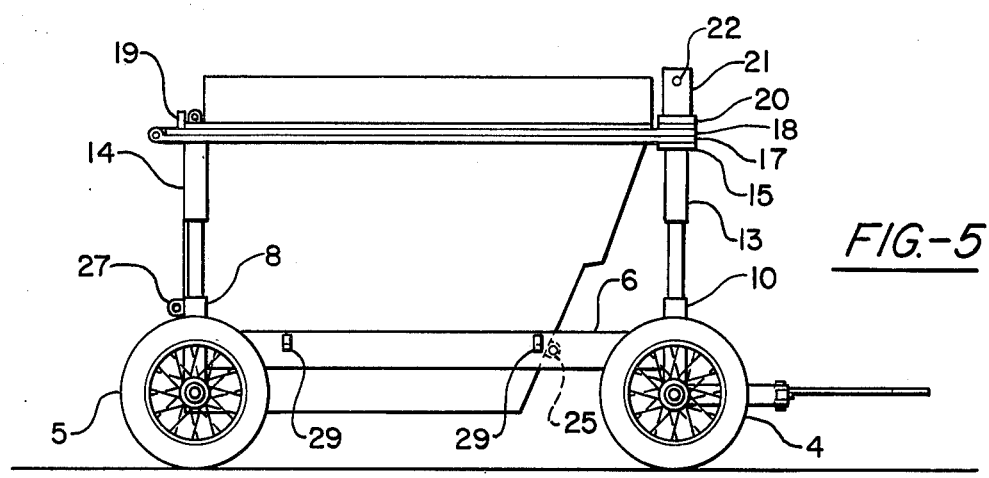
FIG. 5 is a side view of trailer and container in raised position.
Figure 6:
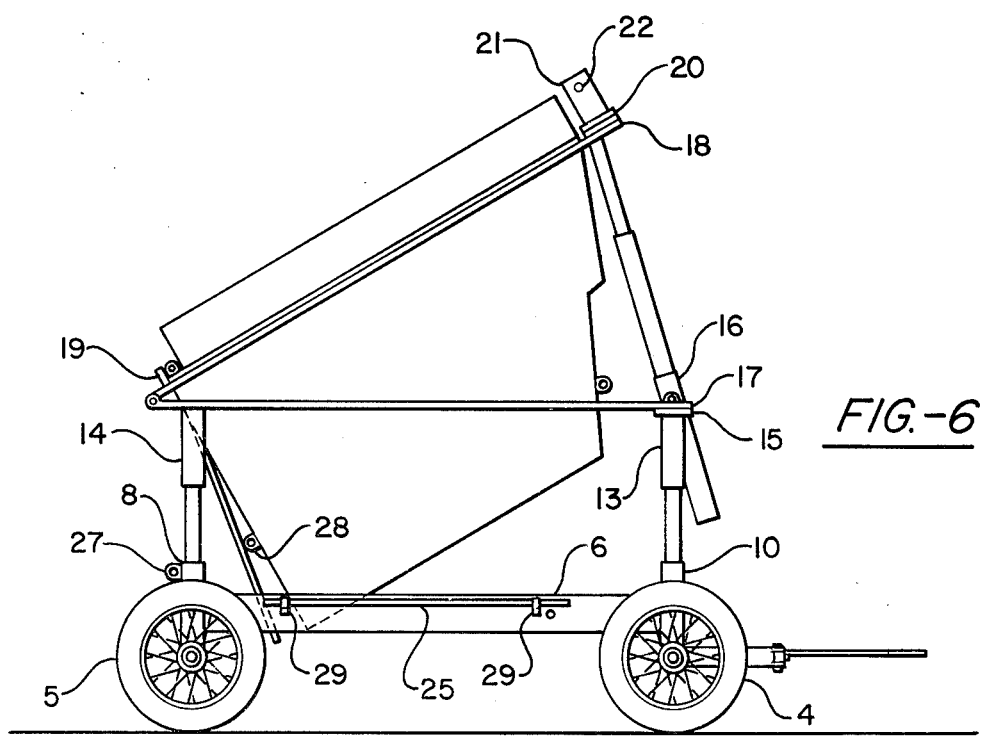
FIG. 6 is a side view of trailer and container in dumping position.

FIG. 2 shows the structure of the container 23 which comprises a lower box-like structure having a slanted front end for clearance of the container with the trailer when the contents are dumped and a standard tailgate 36 which can be fixed in position for carrying or allowed to rotate away from the container about a transverse axis at the top of the gate when the contents are dumped out of the container 23. The upper portion of said container is slightly longer in transverse direction to provide a ledge 24 which is in position directly above said upper transverse members 18 of the trailer such that when the upper frame 2 of said trailer is raised said transverse members 18 engage said ledge 24 and cause the container 23 to rise in a vertical direction. Said container 23 is received through the rear of said trailer when said trailer is in the lowered position as shown in FIG. 4 and is held in a raised position as shown in FIG. 5. Stability is given the trailer and container combination by a pair of locking bars 25 the first of which is inserted through a hole in said lower longitudinal members and which engages the lower front of the container through a bracket 26 as shown in FIGS. 4, 5 and 6, and the second of which is inserted just above rear wheels 5, through brackets 27 fixedly attached to said tubular members 8. Said second locking bar 25 engages said container 23 at the rear through brackets 28 attached to the rear ends of the sides of said container 23, thus providing a means for securing the tailgate. Further the action of said locking bars 25 provides rigidity to the entire structure and prevents the collapsing of the trailer 1 due to the force of inertia when stopping or starting movement of said trailer 1 when container 23 is in a raised position and fully loaded. Further should said hydraulic cylinders received by tubular members 8 and 10 fail, said container 23 is prevented from falling and engaging the roadway while trailer 1 is underway. Said locking bars 25 may be stored on the sides of lower frame secured by brackets 29 fixedly attached to the outer sides of first lower transverse members 6 when not in use. FIG. 6 further shows the action of the stop 19 when the upper longitudinal members 18 are raised to an inclined position with respect to second lower longitudinal members 17.

Figure 3:
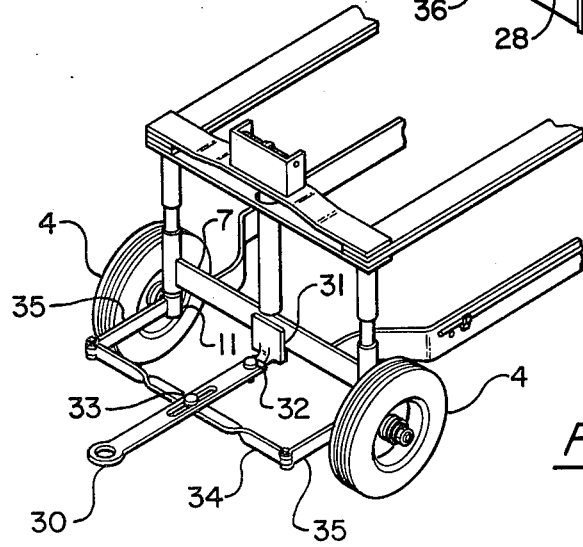
FIG. 3 is a sectioned view of the front of the trailer showing steering of front wheels.

FIG. 3 shows the manner in which a tongue 30 is rotatably attached to said transverse member 7 and provides steering motion for front wheels 4. Said tongue 30 is rotatably attached at one end to said transverse member 7 by means of a bracket 31 and pin 32. A standard means of connection of said tongue to a towing vehicle is provided at the opposite end of said tongue. Said tongue has a longitudinal slot located between the ends for receiving a third pin 33; said pin engages a transverse member 34. Said transverse member 34 is so constructed as to receive said pin 33 through a hole in the center thereof and is rotatably attached at either end to a pair of short horizontal members 35, said short horizontal members 35 are fixedly attached to tubular members 11 at right angles to said spindles; hence when the towing vehicle turns said front wheels 4, said trailer 1 will also turn thereby allowing said trailer 1 to follow said towing vehicle.

It is understood that although the preferred embodiment is in the form of a trailer the specific construction of the trailer 1 could be made self-contained with a prime mover and thus consist of a single vehicle without adverse effects of the operation of said vehicle. Hence the invention could be and is considered equivalent to a truck bed as well as a trailer. Further, although the specific embodiment teaches an open container 23, it is understood that a closed container either for carrying goods or in the form of a camper or the like is also contemplated by applicant herein.

What is claimed by the applicant herein to be his invention is:

1. A container and vehicle in combination comprising:
   (a) a lower U shaped body;
   (b) a plurality of wheels supporting said body;
   (c) a plurality of conventional hydraulic cylinders attached to said body in a vertically disposed position;
   (d) a first upper U shaped member supported by said hydraulic cylinders such that only vertical motion of said first upper U shaped member is possible for raising and lowering the same;
   (e) a second upper U shaped member rotatably attached at the ends opposite the bight of the U to said first upper U shaped member;
   (f) a telescopic hydraulic cylinder attached between the bights of the upper "U" shaped members such that the bight of said second upper U shaped member may be urged away from the bight of said first upper U shaped member when said telescopic hydraulic cylinder is expanded for tilting the same;

(g) a pair of stops attached to the top of said second upper U shaped member at a point near the end of the arms thereof and remote from the bight;

(h) a container having an
  (1) upper U shaped frame having a width greater than the distance between the arms of said second upper U shaped member and diposed above the same when said upper "U" shaped members are in a lowered position,
  (2) a lower box structure attached to said frame having sidewalls, the outer sides of which are spaced apart a distance less than the distance between the arms of said U shaped member, and a bottom, open at one end and slanted at the other, and
  (3) a hinged door hanging within said open end for opening at the bottom when said container is tilted;

(i) a first locking bar for insertion through rear registry holes in said body and said container transverse thereto holding said door closed, and (j) a second locking bar for insertion through front registry holes in said body and the front of said container, transverse thereto, Whereby said upper U shaped members may be lowered, said body may be backed toward said container such that said U shaped members receive said container with the hinged door facing outward, and said upper members may then be raised thereby supporting said container for transport and whereby when dumping is required said telescopic cylinder may be expanded while said upper members are in contact with said container causing tilting of the same and whereby said locking bars lock said container integral with said body lending ridigity to the entire structure.

* * * * *